United States Patent
Watanabe et al.

(10) Patent No.: US 7,137,559 B2
(45) Date of Patent: Nov. 21, 2006

(54) BAR-CODE READER

(75) Inventors: Mitsuo Watanabe, Tokyo (JP); Isao Iwaguchi, Tokyo (JP); Hideo Miyazawa, Tokyo (JP); Kozo Yamazaki, Tokyo (JP); Masanori Ohkawa, Tokyo (JP); Mitsuharu Ishii, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 10/748,232

(22) Filed: Dec. 31, 2003

(65) Prior Publication Data

US 2004/0164156 A1 Aug. 26, 2004

(30) Foreign Application Priority Data

Feb. 21, 2003 (JP) ............................. 2003-044984

(51) Int. Cl.
*G06K 7/10* (2006.01)
(52) U.S. Cl. .................. 235/462.25; 235/462.01
(58) Field of Classification Search ................
235/462.25–462.29, 462.33, 462.01
See application file for complete search history.

(56) References Cited

U.S. PATENT DOCUMENTS

| 6,225,141 | B1 * | 5/2001 | Wenner et al. ................. 438/54 |
| 6,607,134 | B1 * | 8/2003 | Bard et al. ............. 235/472.01 |
| 6,622,919 | B1 * | 9/2003 | Wilz et al. ............. 235/472.01 |
| 2002/0017567 | A1 * | 2/2002 | Connolly et al. ...... 235/472.02 |
| 2003/0137568 | A1 * | 7/2003 | Shinada et al. ................ 347/86 |
| 2004/0065741 | A1 * | 4/2004 | Reddersen et al. .... 235/462.45 |

FOREIGN PATENT DOCUMENTS

| JP | 10-240888 | * 11/1998 |
| JP | 2000-251008 | 9/2000 |

* cited by examiner

*Primary Examiner*—Karl D. Frech
(74) *Attorney, Agent, or Firm*—Armstrong, Kratz, Quintos, Hanson & Brooks, LLP

(57) ABSTRACT

Management information, which is information about hardware in or software installed in the bar-code reader, is stored in a storage unit in the bar-code reader. The management information may be acquired from an external unit or read from a bar code.

20 Claims, 7 Drawing Sheets

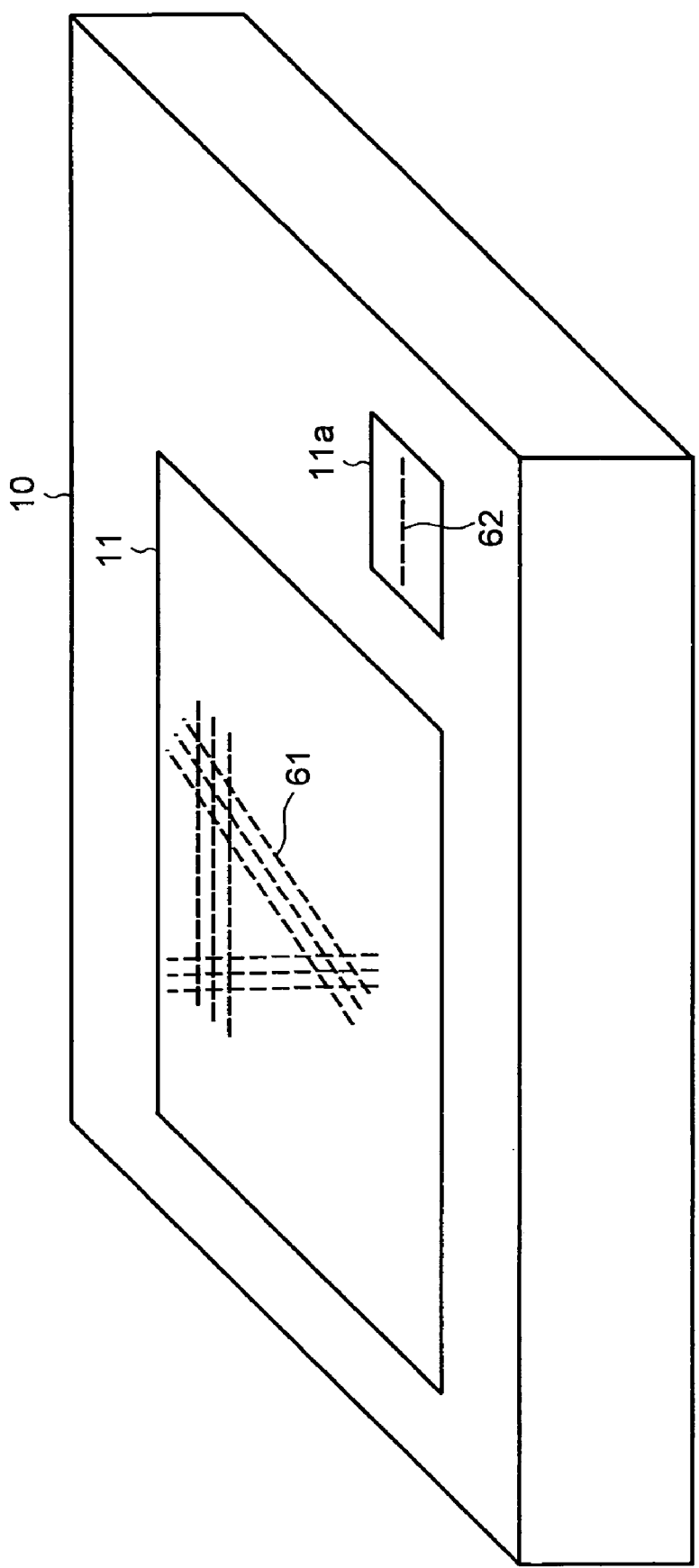

BAR-CODE READER

BACKGROUND OF THE INVENTION

1) Field of the Invention

The present invention relates to a bar-code reader and more particularly to the management of the bar-code readers.

2) Description of the Related Art

Products are managed by providing a bar code to the product and identifying the product by reading this bar code optically. Because the bar code labels can be prepared at a low cost by printing etc., by using such bar code labels, it is possible to reduce the management cost substantially.

The bar-code labels attached to the products are read using a bar code reader. Such a bar code reader generally includes an optical system like a laser reader, a charged coupled device (CCD) camera, etc. The bar code reader receives light that is reflected from a bar code label, determines a pattern of the white lines and the black lines in the bar code from the optical power of the light reflected, and then decodes this pattern to obtain character data that is a pattern of numerals and characters. Such a bar code reader has been disclosed in, for example, Japanese Patent Application Laid-open Application No. 2000-251008.

Each bar-code reader in a shop, for example, is provided with an identification number, i.e., a serial number, for recognizing the bar-code reader. The identification number is directly written or printed on a surface of the bar-code reader, or written or printed on a paper and that paper is stuck to the bar-code reader.

For example, if a bar-code reader needs repairing, a service person recognizes the bar-code reader that needs repairing and notes down the identification number attached to that bar-code reader or inputs the identification number into an information terminal, for management of the bar-code reader. However, manual operation of noting down or inputting the identification number is a tedious work and there is a possibility of making a mistake. Some of the bar-code readers are embedded in a cash counter, and in that case, it is not so easy to read the identification number attached to the bar-code reader.

Conventionally, components in and software installed in the bar-code reader are also managed manually. For example, the laser source used for irradiating laser beam onto a bar code needs to be replaced periodically, and what type of laser source is used in each of the bar-code readers and the laser source of which bar-code reader should be replaced when, is managed manually.

SUMMARY OF THE INVENTION

It is an object of the present invention to at least solve the problems in the conventional technology.

A bar-code reader according to one aspect of the present invention includes a reading unit that reads a bar code optically to thereby acquire a scan data; a decoding unit that processes the scan data to thereby decode contents of the bar code; a storing unit that stores the contents of the bar code if the contents of the bar code is management information that is information about any one of hardware of and software installed in the bar-code reader.

A bar-code reader according to another aspect of the present invention includes a communicating unit that receives management information from an external unit, the management information being information about any one of hardware of and software installed in the bar-code reader; and a storing unit that stores the management information received by the communicating unit.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 7 is a perspective view of the bar-code reader.

DETAILED DESCRIPTION OF EXEMPLARY EMBODIMENTS

Exemplary embodiments of a bar-code reader according to the present invention are explained in detail below with reference to the accompanying diagrams.

Figure 1:
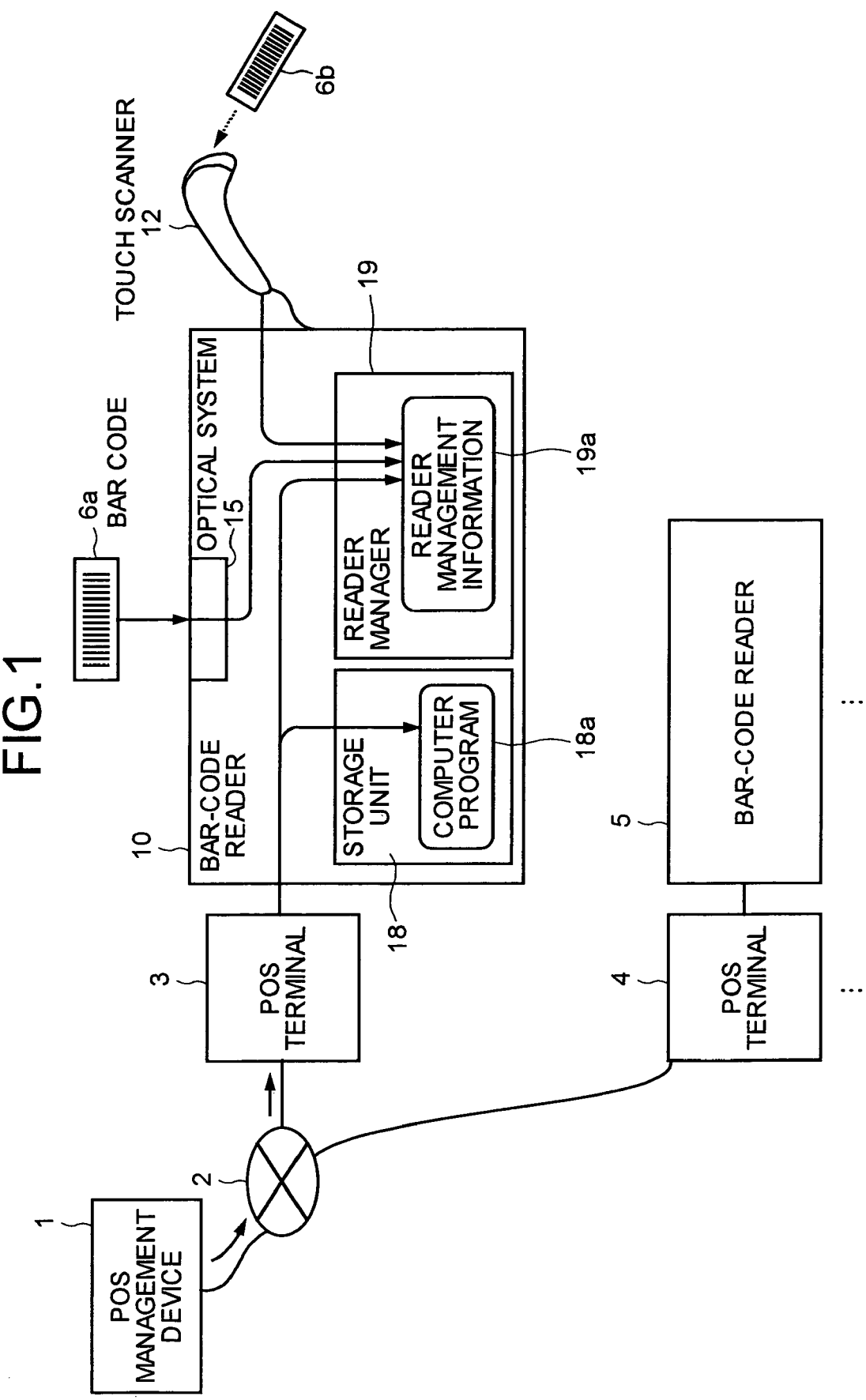
FIG. 1 is an illustration of a POS system that use a bar-code reader according to an embodiment of the present invention.

FIG. 1 is an illustration of a POS system that uses a bar-code reader according to an exemplary embodiment of the present invention. This POS system includes a plurality of POS terminals 3 and 4 that are connected to a POS management device 1 via a network 2.

A bar-code reader is connected to each of the POS terminals. Concretely, a bar-code reader 10 is connected to the POS terminal 3 and a bar-code reader 5 is connected to the POS terminal 4. The bar-code reader 10 irradiates a laser beam on a bar code and creates bar-code data that indicate a bar-code pattern, from the light reflected from the bar code. Further, the bar-code reader 10 decodes the bar-code data and creates character data of numerals and alphabets. The bar-code reader 10 then transmits the character data to the POS terminal 3. The POS terminal 3 transmits product information based on the character data, to the POS management device 1.

The bar-code reader 5, similar to the bar-code reader 10, creates character data from the bar code and transmits the character data to the POS terminal 4 and other POS terminals that are not shown in the diagram. The POS terminal 4, similar to the POS terminal 3, transmits product information based on the character data, to the POS management device 1.

Similarly, the bar-code readers that are not shown in the diagram create character data from the bar code and transmit the character data to the POS terminals. The POS terminals transmit the product information to the POS management device 1. Thus, the POS management device 1 can perform product management by collecting the product information from the POS terminals 3 and 4, and the POS terminals that are not shown in the diagram.

In the POS system that is shown in FIG. 1, the bar-code reader manages the device by storing information of a configuration of the bar-code reader. Concretely, the bar-code reader 10 stores reader-management information 19a in a reader manager 19.

The reader-management information 19a includes versions or identification information for identifying the bar-code reader 10 and versions or identification information for identifying computer programs and components which are included in the bar-code reader 10. Because it is necessary to store the information irrespective of whether the power supply is made to the bar-code reader 10 or not, it is desirable that the reader manager 19 is a non-volatile memory.

The bar-code reader 10 acquires the information that is to be stored in the reader manager 19 from the bar code or the POS terminal 3. When obtaining the information from the bar code, the bar-code reader 10 reads bar-code data either by scanning a bar code 6a with an optical system 15 or by scanning a bar code 6b with a touch scanner 12.

The bar-code reader 10 converts the bar-code data to character data and decides whether to store the character data in the reader manager 19 based on the content of the character data or to transmit the character data to the POS terminal 3. Acquiring the information from the bar code is useful in a case of acquiring information of the bar-code reader 10 or in a case of acquiring information of each component of the bar-code reader 10.

For example, while storing an identification number of the bar-code reader 10 in the reader manager 19, the identification number is written on an identification plate in the form of a bar code and the identification number may be read at the time of shipment or delivery.

Similarly, for the components, an identification number of the component can be stored by reading the bar code during manufacture or during replacement of the component. Particularly, for a component like a laser device that needs to be replaced periodically, by storing the date and time of replacement, the subsequent time of replacement can be predicted.

A method of acquiring information from the POS terminal is useful for version management of a computer program. For example, when there is a correction in a computer program that is used by the bar-code reader, the computer program that is subjected to correction is stored in the POS management device 1 and the computer program is then transmitted to the bar-code reader via the network 2 and the POS terminal 3. Further, the computer program that is stored in a storage unit 18, is updated by overwriting.

When the computer program is updated, by storing a version and a revision of the updated computer program in the reader manager 19, the management of the version of the program that is stored in the bar-code reader 10 can be performed.

Figure 2:
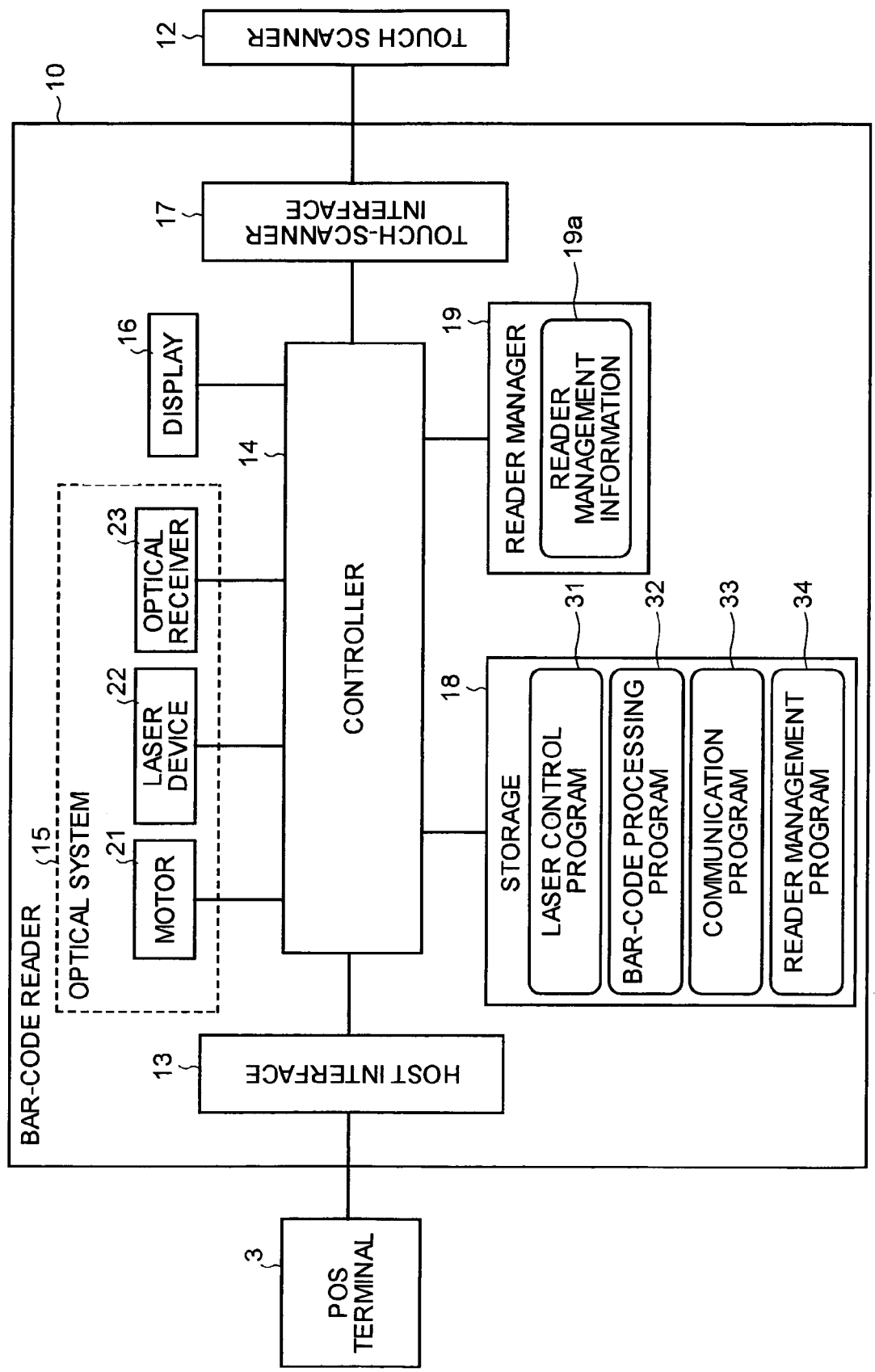
FIG. 2 is a detailed block diagram of the bar-code reader.

FIG. 2 is a detailed block diagram of the bar-code reader 10. The bar-code reader 10 includes a host interface 13, a controller 14, an optical system 15, a display 16, a touch-scanner interface 17, the storage unit 18, and the reader manager 19.

The controller 14 controls the bar-code reader 10 and executes processing by reading the computer program that is stored in the storage unit 18. Concretely, the storage unit 18 stores a laser control program 31, a bar-code processing program 32, a communication program 33, and a reader management program 34.

The optical system 15 includes a motor 21, a laser device 22, and an optical receiver 23. The controller 14 controls the optical system 15 by using the laser control program 31 and scans the bar code with laser beam.

The controller 14 receives the bar-code data that is read by the touch scanner 12 via the touch-scanner interface 17.

Therefore, when the controller 14 reads the bar code, the optical system 15 and the touch scanner 12 can be used alternately.

Concretely, if a product size is big enough to allow the handling of the product by both hands of a shop assistant, the shop assistant lifts the product with both hands and reads the bar code by placing the bar code affixed to the product, near the optical system 15. If the size of the product is not big enough to allow the handling with both hands of the shop assistant, the shop assistant lifts the product up with one hand and reads the bar code by placing the touch scanner 12 on the bar code with other hand. For a product that cannot be lifted up easily, the shop assistant carries the touch scanner 12 to the position where the bar code is affixed on the product and reads the bar code.

The controller 14 decodes the bar-code data that is read, by executing the bar-code processing program 32 and converts the bar-code data to the character data. The controller 14, upon completion of the conversion to the character data, informs the completion of the bar-code reading by the display 16. The display 16 has an LED (Light Emitting Diode) and a speaker, and informs the successful completion of the bar-code reading by glowing the LED and sending an audible message from the speaker.

The display 16, apart from the completion of the bar-code reading, informs messages such as an error message. The display 16 may be equipped with a display such as a seven segment display. Information to be informed can be increased by providing such a display.

Upon conversion of the bar-code data, the controller 14 makes a judgment of whether the character data indicates the product information or is data of the bar-code reader or of the components of the bar-code reader. If the character data is data of the product, the controller 14, uses the communication program 33 and transmits the character data to the POS terminal 3 via the host interface 13. If the character data is data of the bar-code reader or of the components of the bar-code reader, the controller 14 stores the character data in the reader manager 19 as the reader-management information 19a. In this case, the controller 14 executes the reader-management program 34.

Figure 3:
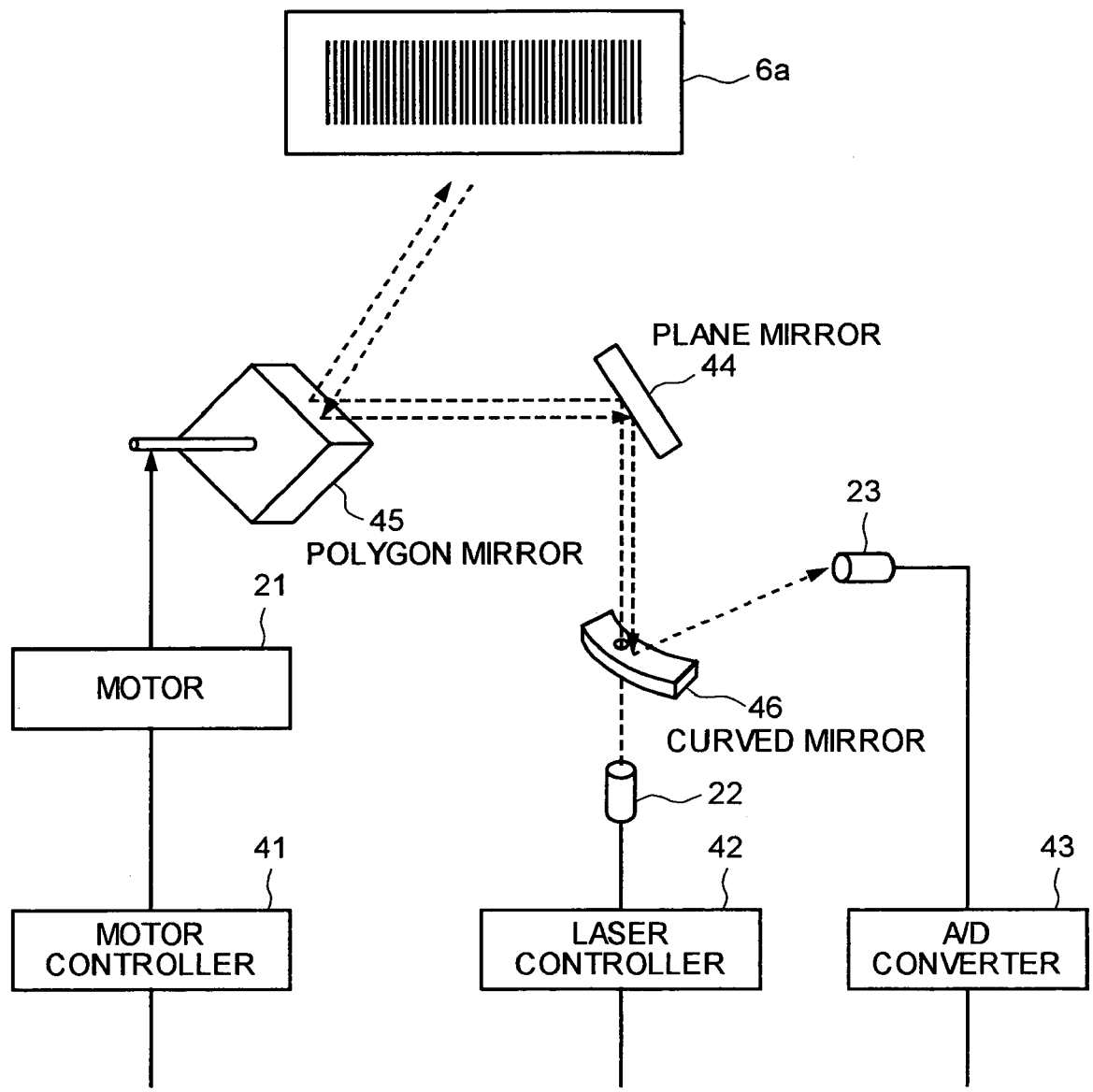
FIG. 3 is an illustration of an optical system in the bar-code reader.

FIG. 3 is an illustration of the configuration of the optical system 15. The optical system 15 includes a motor controller 41, the motor 21, a polygon mirror 45, a plane mirror 44, a curved mirror 46, a laser controller 42, the laser-device 22, the optical receiver 23, and an A/D converter 43.

The motor controller 41 controls the rotation of the motor 21 by the control from the controller 14. The polygon mirror 45 is connected to the motor 21 and rotates according to the rotation of the motor 21.

The laser controller 42 causes the laser device 22 to emit by the control from the controller 14. Laser beam emitted from the laser device 22 passes through an aperture in the curved mirror 46 and is reflected from the plane mirror 44. Further, the laser beam is reflected from the polygon mirror 45 and irradiated on the bar code 6a.

The light reflected from the bar code 6a is reflected from the polygon mirror 45 is again reflected from the plane mirror 44 and then focused by the curved mirror to be input to the optical receiver 23. The optical receiver 23 is realized, for example by a photodiode and inputs the intensity of the reflected light that is input to the A/D converter 43 as electric signal. The A/D converter 43 converts the electric signal to a digital signal and transmits the digital signal to the controller 14.

Because the motor 21 rotates the polygon mirror 45, an angle of reflection of the laser beam that is reflected from the plane mirror 44 varies with time. Therefore, the bar code 6a can be scanned by shifting the irradiating position of the laser beam on the bar code 6a.

The controller 14 decodes the bar-code data that is acquired by scanning the bar code 6a by the optical system 15 and converts the bar-code data to character data. The controller 14 then transmits the character data to the POS terminal 3 if the data is related to the product. If the character data is management information, the controller 14 stores the character data in the reader manager 19.

Figure 4:
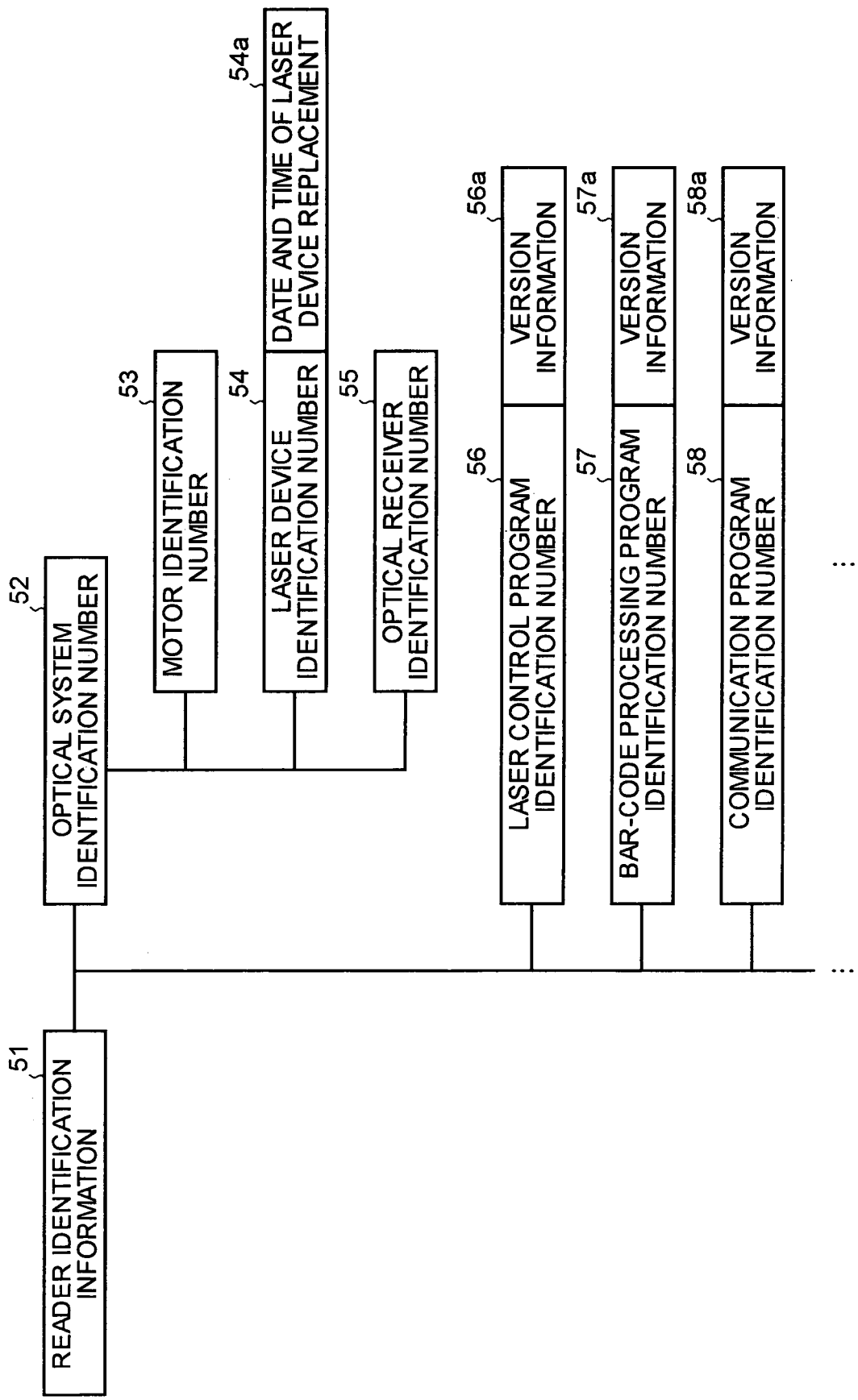
FIG. 4 is an example of reader-management information.

The reader-management information 19a that is stored in the reader manager 19 is described below by referring to FIG. 4. FIG. 4 is an illustration of an example of the reader-management information 19a. The reader-management information 19a includes reader-identification information 51 as information of the bar-code reader 10. Concretely, the reader identification information 51 is data of serial numbers and versions of the bar-code reader 10.

The information of components or computer programs of the bar-code reader is associated with the reader identification information 51. Concretely, an optical-system identification number 52, a laser control program identification number 56, a bar-code processing program identification number 57, and a communication program identification number 58 are associated with the reader identification information 51.

The optical system identification number 52 is data of the configuration of the optical system 15. The laser control program identification number 56 is data that identifies the laser control program 31. Version information 56a, which indicates a version of the laser control program 31, is added to the laser control program identification number 56.

Similarly, the bar-code processing program identification number 57 is data that identifies the bar-code processing program 32. Version information 57a, which indicates version of the bar-code processing program 32, is added to the bar-code processing program identification number 57. The communication program identification number 58 is data that identifies the communication program 33. Version information 58a, which indicates version of the communication program 33 is added to the communication program identification number 58.

Moreover, information of components of the optical system 15 is associated with the optical system identification number 52. Concretely, a motor identification number 53, a laser device identification number 54, an optical receiver identification number 55 are associated with the optical system identification number 52. The motor identification number 53 is information of the motor 21. Concretely, the motor identification number 53 stores information like a product number of the motor 21.

Similarly, the laser device identification number 54 is information of the laser device 22 and information like product number of the laser device 22 is stored. The optical receiver identification number 55 is information of the optical receiver 23 and concretely, information like a product number of the optical receiver is stored.

Date and time of laser device replacement 54a is added to the laser device identification number 54. The laser device 22 reaches the end of life after having used for certain time and needs to be replaced. The subsequent time of replacement of the laser device 22 can be predicted from the date and time of replacement that is recorded.

Thus, the reader management information 19a stores, hierarchically, information corresponding to the configuration of the bar-code reader 10. Therefore, the required information of the configuration of the bar-code reader 10 can be read out from the reader management information 19a, and used.

Figure 5:
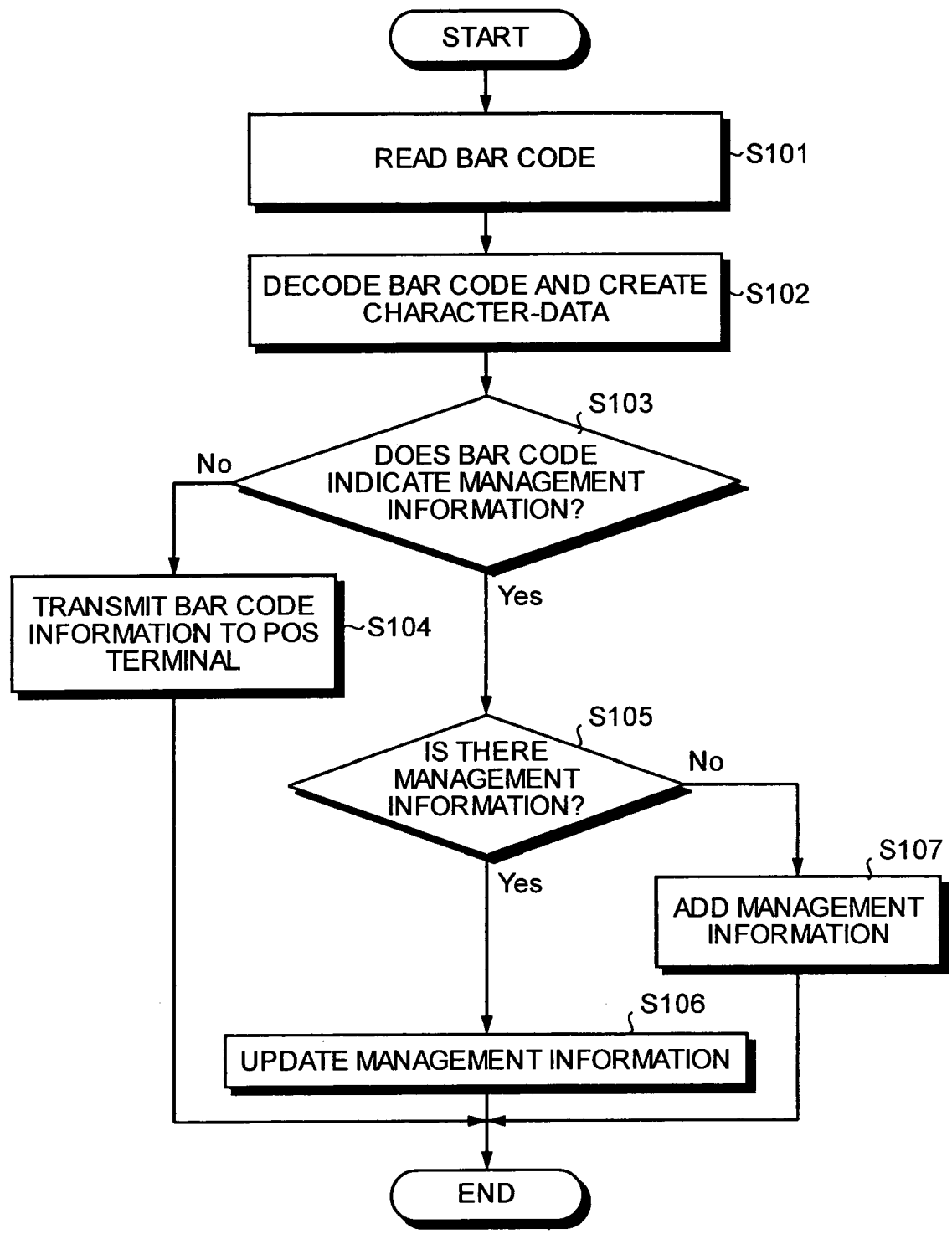
FIG. 5 is a flow chart of a process performed by a controller.

A process of reading out management information from the bar code by the controller 14 and storing the management information in the reader manager 19 is described below by referring to FIG. 5. FIG. 5 is a flow chart of the process that is performed during a scan operation of the controller 14. The controller 14 scans the bar code 6a by using the optical system 15 and acquires bar-code data (step S101). Concretely, the controller 14 scans the bar code 6a by rotation of the motor 21 and emission of light from the laser device 22.

Further the controller 14 decodes the bar-code data and creates character data (step S102). Then, the controller 14 makes a judgment of whether the bar code 6a indicates the management information or not, by checking the character data (step S103). For example, the controller 14 embeds, in advance, a specific character pattern that indicates whether or not it is the management information. The judgment of whether or not the bar code 6a indicates the management information, is made by checking if the specific character pattern is there or not.

If the bar code 6a does not indicate the management information (step S103, No.), the controller 14 makes a judgment of the bar code 6a indicating product data, and transmits the character data to the POS terminal (step S104), thereby ending the process. Whereas, if the bar code 6a indicates the management information (step S103, Yes), the controller makes a judgment of whether or not the management information is there in the reader management information 19a (step S105).

If there is management information in the reader management information 19a (step S105, Yes), for example, if the character data is a laser device identification number and if laser device identification information is there in the reader management information 19a, the controller 14 updates the information by overwriting the management information (step S106), and ends the process.

On the other hand, if there is no management information in the reader management information 19a (step S105, No.), for example, if the character data is a laser device identification number and if laser device identification information is not there in the reader management information 19a, the controller 14 adds the management information to the reader management information 19a (step S107) and ends the process.

The reading of a bar code by using the optical system 15 is explained here. A bar code is read by using the touch scanner 12 in a similar manner. In other words, when bar code data that is acquired from the touch scanner 12 is decoded, a judgment of whether or not the bar code indicates the management information is made. If the bar code indicates the management information, the management information is written in the reader manager 19.

Figure 6:
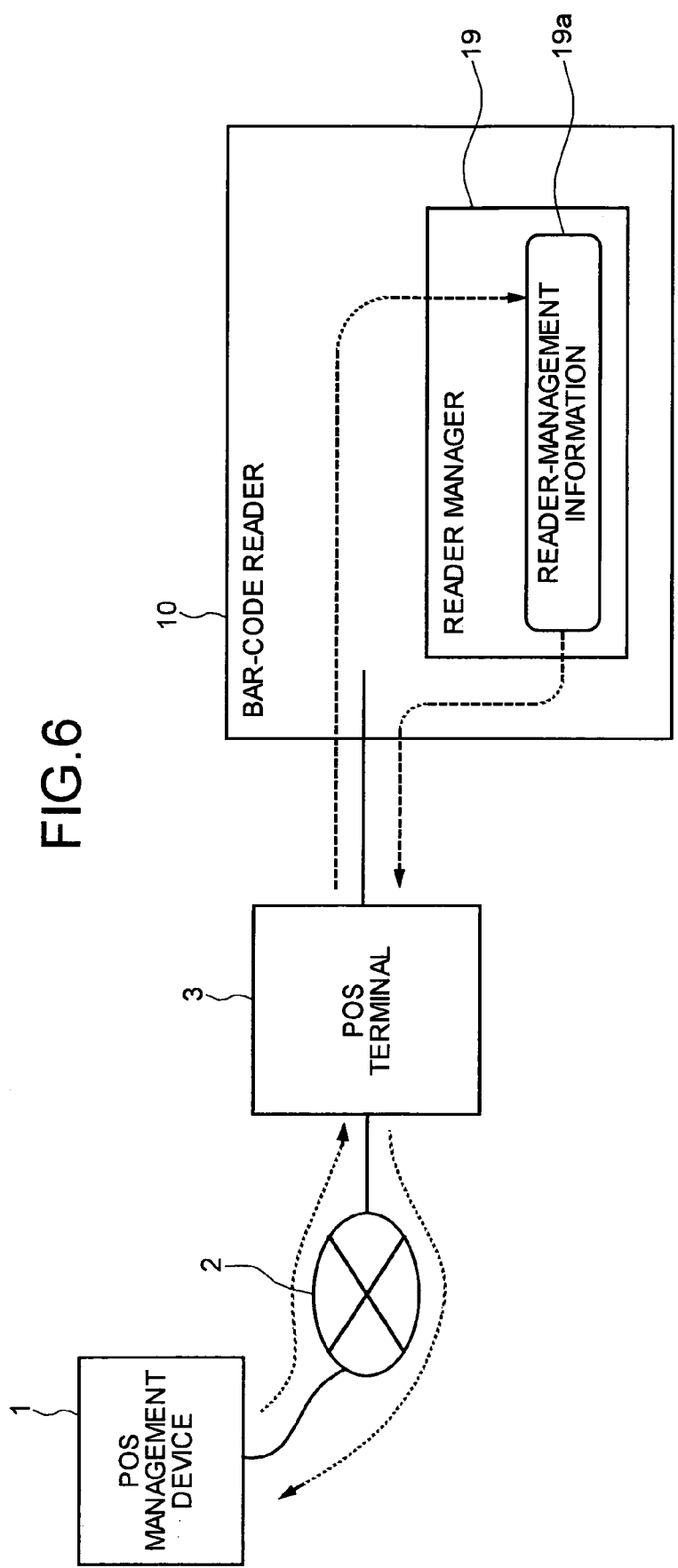
FIG. 6 is an illustration of a process of reading out the reader management information in response to a request from a point-of-sales (POS) management device.

The reader management information that is stored in the reader manager 19 can be read out when required. FIG. 6 is an illustration of a process of reading out the reader management information in response to a request from the POS management device 1.

The POS management device 1 transmits a management-information check request to the POS terminal 3 via the network 2. The POS terminal 3, upon receiving the management-information check request, requests the bar-code reader 10 to read out the management information. The bar-code reader 10 receives the request from the POS terminal 3 via the host interface 13. The bar-code reader 10 reads out the management information from the reader management information 19a and transmits the management information to the POS terminal 3. The POS terminal 3 transmits the management information that is received from the bar-code reader 10, to the POS management device 1 via the network 2.

Thus, the POS management device 1 receives the information of the bar-code reader 10 by transmitting the management-information check request to the POS terminal 3. Therefore, the POS management device 1 collects information of the bar-code readers that are connected to the plurality of POS terminals via the network 2 and can perform collective management of the information of the bar-code readers.

For the transmission of the management information, the bar-code reader 10 uses the host interface 13 that is used in transmission of the product data. Therefore, the bar-code reader 10 can transmit the management information to the POS terminal or the POS management device 1 without providing a new communication device.

The reader management information 19a is read not only upon the request from the POS management device 1. For example, the POS terminal 3 can make a request for the management information or the bar-code reader 10 can read out the management information independently (without the request).

In such a configuration, the management information is stored in the reader manager 19. However, the storing of the management information is not restricted only to such storing method. The management information can be stored by any method of storing, provided that the management information can be read when required.

For example, the management information may be stored by affixing a seal having a bar code printed on it, within a range that allows reading by the optical system 15. FIG. 7 is an illustration of a configuration of a bar-code reader in which the management information is affixed by a seal.

The bar-code reader 10 includes reading windows 11 and 11a that include a transparent material like glass. The reading window 11 is a reading window that is used in normal bar-code scan. While reading a bar code that is affixed to a product, the optical system 15 irradiates laser beam through the reading window 11. In this case, the optical system 15 has to scan the bar code such that the bar code can be read irrespective of a direction in which the bar code is placed. For this, in FIG. 7, the optical system 15 scans the bar code by using a scan pattern 61, which is called a delta scan.

The reading window 11a is used while reading a bar-code seal that indicates the management information. The bar-code seal can be read when required by affixing the bar code seal to the reading window 11a. Therefore, for example, if a bar-code seal that indicates a serial number of the bar-code reader 10 is affixed to the reading window 11a, the serial number is not required to be stored necessarily in the reader manager 19. When the serial number of the bar-code reader 10 is required, the serial number can be acquired by scanning the reading window 11a.

Because the bar code can be affixed on the reading window 11a according to the scan direction of the laser beam, in FIG. 7, the bar code can be scanned by using a scan pattern 62, which is called single scan.

Thus, in a case of providing the reading window 11a independently for reading the bar code that indicates the management information, a scanning process of scanning the reading window 11 and a scanning process of scanning the reading window 11a are included in the laser control program 31. As a result of this, the reading windows 11 and 11a can be used alternately.

The reading window 11a need not be necessarily independent from the reading window 11 and the bar-code seal can be affixed to the reading window 11. In such a case, it is advisable to affix the bar-code seal in a position that does not hinder the normal scanning process.

When the bar-code seal for the management information is affixed inside the reading window 11, the bar code may be allowed to be read out by the same scanning process for the bar code of the product and the bar-code seal for the management information, or by different scanning processes.

Thus, according to the present embodiments, the bar-code reader 10 is equipped with the reader manager 19 and the information of the device configuration is stored as the reader management information 19a. As a result of this, it is possible to read out information like the version information of the computer program, the product number of the component, the serial number of the bar-code reader, when required. Moreover, as a result of the configuration that allows reading of the serial number, the product number, etc., from the bar code, the load of inputting information like the serial number and the product number, on user is reduced. This enables efficient management to be carried out.

Furthermore, the information of the device configuration that is received via the POS terminal 3 is stored in the reader manager 19. As a result of this, the version of the computer program can be updated automatically. Because the date and time of replacement of parts is recorded, the management of time of replacement of parts can be performed.

Thus, according the present invention, manual operation in the management of the bar-code readers can be reduced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A bar-code reader comprising:
   a reading unit that reads a bar code optically to thereby acquire a scan data;
   a decoding unit that processes the scan data to thereby decode contents of the bar code;
   a reader management storing unit that determines whether the contents of the bar code is management information that is information about any one of hardware and of software installed in the bar-code reader and stores the contents of the bar code only if the contents of the bar code is the management information.

2. The bar-code reader according to claim 1, wherein the reading unit scans the bar code by shifting a position of irradiation of laser beam on the bar code.

3. The bar-code reader according to claim 1, wherein the reading unit is an optical touch scanner.

4. The bar-code reader according to claim 1, further comprising a communicating unit that reads, if there is a request for the management information from an external terminal, management information corresponding to the request from the storing unit and transmits the management information read to the external terminal.

5. The bar-code reader according to claim 1, wherein the storing unit is installed in a position that enables reading by the reading unit and a management-information bar-code with contents same as the management information is attached to the storing unit.

6. The bar-code reader according to claim 4, wherein a label-setting area is provided for setting the management-information bar-code and the reading unit reads the label-setting area selectively when management information is to be acquired.

7. The bar-code reader according to claim 1, wherein the management information includes a serial number assigned to the bar-code reader.

8. The bar-code reader according to claim 1, wherein the management information includes a serial number assigned to a component of the bar-code reader.

9. The bar-code reader according to claim 1, wherein the management information includes a version of the bar-code reader.

10. The bar-code reader according to claim 1, wherein the management information includes a version of a component of the bar-code reader.

11. The bar-code reader according to claim 1, wherein the management information includes a version of software installed in the bar-code reader.

12. The bar-code reader according to claim 1, wherein the management information is date and time of replacement of a component of the bar-code reader.

13. A bar-code reader comprising:
a communicating unit that receives information including management information from an external unit, the management information being information about any one of hardware of and software installed in the bar-code reader; and
a reader management storing unit that determines whether the received information is said management information and stores the received information only if the received information is said management information.

14. The bar-code reader according to claim 13, wherein the communicating unit reads, if there is a request for the management information from the external terminal, management information corresponding to the request from the storing unit and transmits the management information read to the external terminal.

15. The bar-code reader according to claim 13, wherein the management information includes a serial number assigned to the bar-code reader.

16. The bar-code reader according to claim 13, wherein the management information includes a serial number assigned to a component of the bar-code reader.

17. The bar-code reader according to claim 13, wherein the management information includes a version of the bar-code reader.

18. The bar-code reader according to claim 13, wherein the management information includes a version of a component of the bar-code reader.

19. The bar-code reader according to claim 13, wherein the management information includes a version of software installed in the bar-code reader.

20. The bar-code reader according to claim 13, wherein the management information is date and time of replacement of a component of the bar-code reader.

* * * * *